United States Patent
Besse et al.

(10) Patent No.: US 12,245,720 B2
(45) Date of Patent: Mar. 11, 2025

(54) DEVICE FOR PRODUCING MILK OR MILK FOAM BEVERAGES AND METHOD FOR HEATING MILK OR MILK FOAM

(71) Applicant: EVERSYS S.A., Sierre (CH)

(72) Inventors: Jonathan Besse, Chamoson (CH); Paul Rouiller, Martigny-Croix (CH); Sébastien Robyr, Sierre (CH)

(73) Assignee: EVERSYS S.A., Sierre (CH)

( * ) Notice: Subject to any disclaimer, the term of this patent is extended or adjusted under 35 U.S.C. 154(b) by 0 days.

(21) Appl. No.: 18/570,384

(22) PCT Filed: Oct. 5, 2022

(86) PCT No.: PCT/EP2022/077623
§ 371 (c)(1),
(2) Date: Dec. 14, 2023

(87) PCT Pub. No.: WO2023/066659
PCT Pub. Date: Apr. 27, 2023

(65) Prior Publication Data
US 2024/0215753 A1     Jul. 4, 2024

(30) Foreign Application Priority Data
Oct. 19, 2021   (DE) ................... 20 2021 105 696.7

(51) Int. Cl.
*A47J 31/44*     (2006.01)
*A47J 31/52*     (2006.01)
*F24H 1/10*     (2022.01)

(52) U.S. Cl.
CPC ....... *A47J 31/4485* (2013.01); *A47J 31/5253* (2018.08); *F24H 1/10* (2013.01); *A47J 2202/00* (2013.01)

(58) Field of Classification Search
CPC ...... A47J 31/002; A47J 31/4403; A47J 31/42; A47J 42/50; A47J 31/4492; A47J 31/407;
(Continued)

(56) References Cited

U.S. PATENT DOCUMENTS

2017/0273502 A1*   9/2017   Doglioni Majer ...... A47J 31/56
2019/0000263 A1*   1/2019   Knip ....................... A47J 31/52

FOREIGN PATENT DOCUMENTS

DE    102014216534 B3    2/2016
DE    102017123642 A1    4/2019
(Continued)

OTHER PUBLICATIONS

English translation, Int'l. Search Report from PCT/EP2022/077623, Jan. 20, 2023, European Patent Office, NL.
(Continued)

*Primary Examiner* — Phuong T Nguyen
(74) *Attorney, Agent, or Firm* — Frost Brown Todd, LLP; Alexander J. Johnson

(57) ABSTRACT

The disclosure relates to a device for producing milk beverages or milk foam beverages, comprising a pump, a milk intake line connected to the pump and connectable to a milk reservoir, an outlet line connected to the pump, and a heating element. The heating element comprises at least two series-connected flow heaters. The disclosure furthermore relates to a method for heating milk or milk foam, in which cold milk or cold milk foam is sucked by means of a pump out of a milk intake line connected to a milk reservoir and conveyed into an outlet line connected to the pump, and heated by means of a heating element, wherein the milk or the milk foam is conducted successively through at least two series-connected flow heaters of the heating element.

10 Claims, 4 Drawing Sheets

Figure 1:
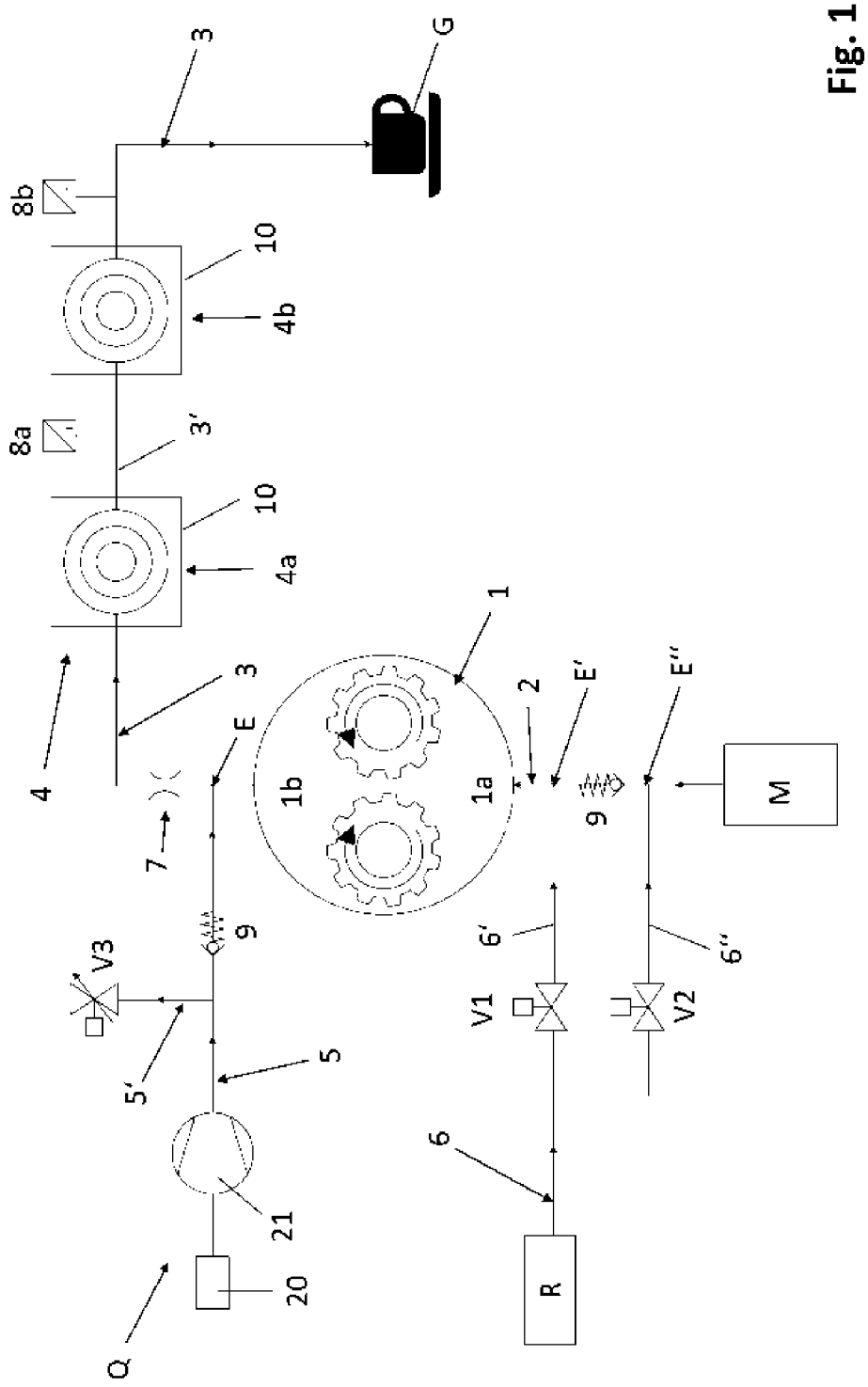

(58) Field of Classification Search
CPC .............. A47J 31/4485; A47J 31/5253; A47J 2202/00; F24H 1/10
USPC ................ 99/280, 285, 286, 295, 300, 453
See application file for complete search history.

(56) References Cited

FOREIGN PATENT DOCUMENTS

| | | |
|---|---|---|
| EP | 1593330 A2 | 6/2009 |
| EP | 2869742 B1 | 7/2016 |
| EP | 3476260 A2 | 5/2019 |
| WO | 2017155403 A1 | 9/2017 |

OTHER PUBLICATIONS

Search Report from priority DE Appln. No. 20 2021 105 696.7, Aug. 6, 2022.

\* cited by examiner

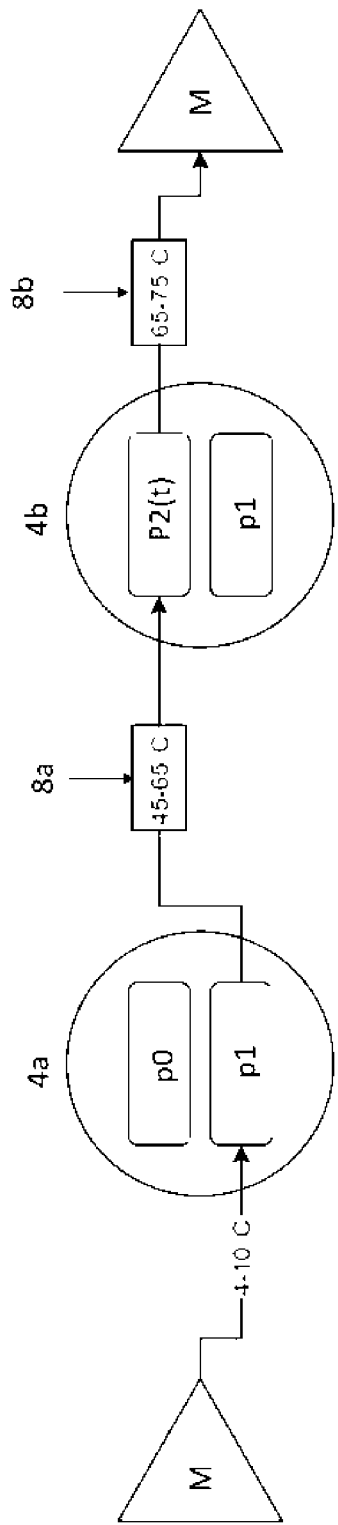
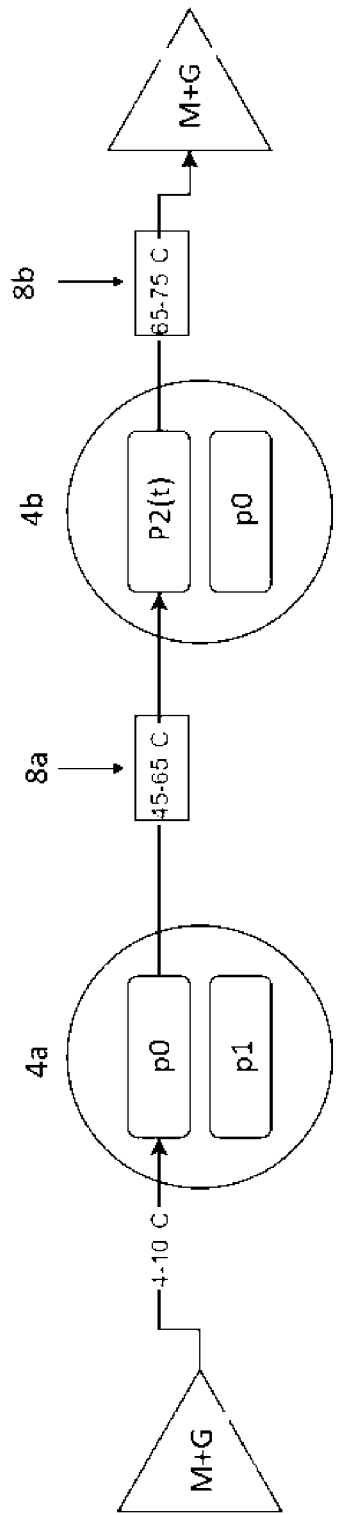
Fig. 2A
Fig. 2B

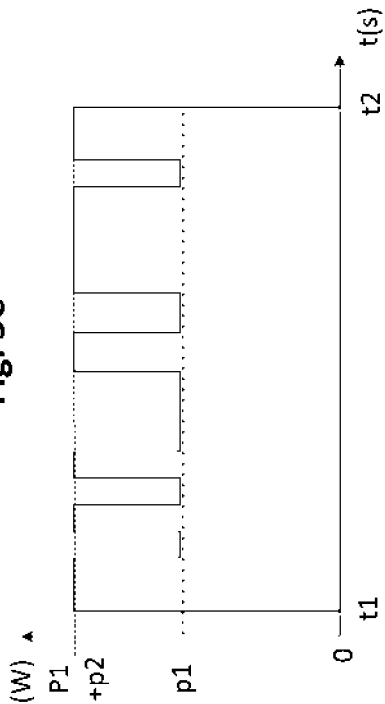
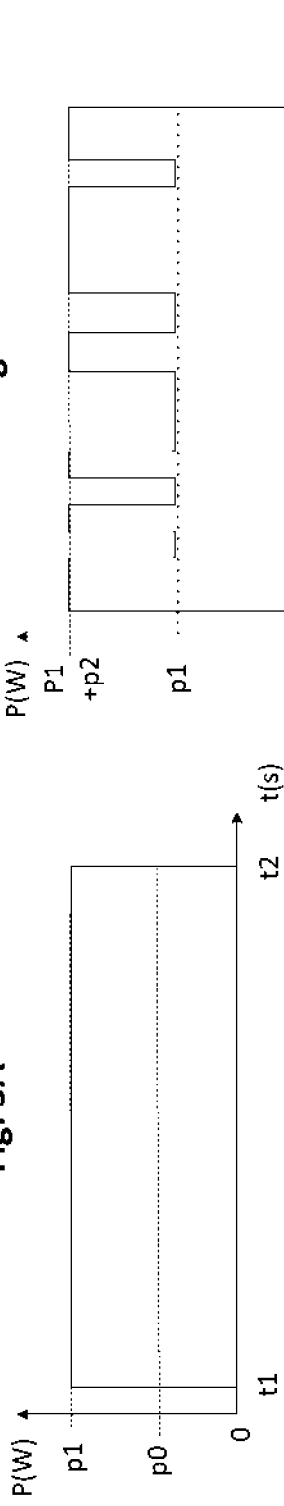
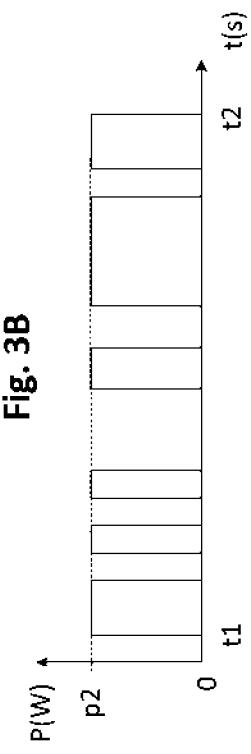

DEVICE FOR PRODUCING MILK OR MILK FOAM BEVERAGES AND METHOD FOR HEATING MILK OR MILK FOAM

The invention relates to a device for producing milk or milk foam beverages and to a method for heating milk or milk foam.

From EP 1 593 330 A2 a method for producing milk foam or warm milk beverages and a device for carrying out the method are known, in which milk is sucked from a container by means of a pump and conveyed to an outlet, wherein, for the production of milk foam, air or another gas can be admixed to the milk in a controllable quantity, and the milk or the milk foam produced is passed through a continuous-flow heater during suction in order to heat the milk or the milk foam, and the heated milk or the heated milk foam is then conveyed to the outlet via a throttle point. In this regard, due to the use of a continuous flow heater to heat the milk or milk foam, cold milk can be drawn directly from any container without having to be transferred to a special container for heating. Furthermore, due to the use of a continuous flow heater as a heating element for heating the milk or the milk foam, no expensive and maintenance-intensive resistance passage element is required, because the heated milk or the heated milk foam can directly be conveyed to the outlet via a throttle point. Furthermore, the use of a continuous flow heater makes it possible to heat the milk or milk foam quickly, and the continuous flow heater used as the heating element makes it possible to clean the device, including the heating element, quickly and easily. The use of complex mixing devices in which milk is interspersed with hot water vapor to produce warm milk foam is eliminated by the use of a flow heater in which cold milk foam can be heated to a desired set temperature However, the use of a flow heater as a heating element in devices for heating milk or milk foam also leads to disadvantages. For example, due to a locally very high surface temperature in the flow heater, the milk passed through the flow heater may burn locally and lead to incrustations or milk deposits in an instantaneous channel of the flow heater. Such incrustations or milk deposits can only be removed by using aggressive and, in particular, acidic cleaning solutions, which is why cleaning is regularly required using expensive cleaning agents from which a cleaning solution is prepared in order to remove the incrustations or milk deposits from the flow heater. This complicates and increases the cost of cleaning the device.

Furthermore, when using flow heaters in devices in which both cold milk and milk foam are to be heated, problems can arise with fluctuating current levels in the power supply network from which the flow heater is supplied with electrical power due to the different heating powers required for heating milk or milk foam and the associated load fluctuations of the flow heater. In order to prevent fluctuation of the operating voltage in power supply networks, larger consumers must meet certain requirements to avoid flicker (electrical voltage fluctuations in power supply networks), which are regulated in DIN EN 61000-3-3. In particular, larger loads should not exceed a short-term flicker strength, determined over an interval of 10 minutes, of 1.0. This cannot be readily guaranteed when using flow heaters to heat milk or milk foam due to the fluctuating heating loads.

On this background, the invention is based on the task of providing a device and a method with which both milk and milk foam can be heated in a simple and fast manner without causing inadmissible load fluctuations of the heating element used for heating the milk or milk foam, and enabling simple cleaning of the heating element by avoiding milk deposits and incrustations in the heating element.

These tasks are solved with the device and method having the features as described herein.

The task is solved according to the invention with a device for producing milk or milk foam beverages, wherein the device comprises a pump, a milk suction line connected to the pump, in particular at a pump inlet, which is connectable to a milk reservoir, an outlet line connected to the pump, in particular at a pump outlet, and a heating element, wherein the heating element comprises at least two flow heaters connected in series.

In the method for heating milk or milk foam according to the invention, cold milk or cold milk foam is sucked by means of a pump from a milk suction line connected to a milk reservoir and conveyed into an outlet line connected to the pump and heated by means of a heating element, the milk or milk foam being passed for heating successively through at least two serially connected flow heaters of the heating element.

By using (at least) two flow heaters connected in series, incrustations and milk deposits in the heating element can be avoided because the (maximum) temperature in the flow heaters generated during a heating cycle for heating the milk or milk foam in the flow heaters can be kept lower compared to using a heating element containing only a single flow heater. When using a single flow heater to heat milk to a temperature of, for example, 70° C. or more, during a heating cycle temperatures in excess of 100° C. are generated locally and in particular at the center of the flow heater. At these high temperatures, which occur in particular on the walls of a flow channel of the flow heater, local burning of the milk passing through can occur, resulting in milk deposits and incrustations which can accumulate on the channel walls of the flow channel of the flow heater and thereby reduce the channel cross-section, or which are discharged as particles together with the heated milk from the flow channel of the flow heater and can thereby adversely affect the product quality of the heated milk beverage and, in particular, lead to an undesirable change in taste.

By using a heating element with at least two continuous flow heaters connected in series, the maximum temperature generated in the flow heaters can be reduced, in particular to temperatures below: 100° C., which reliably prevents the milk passing through from burning. The device and method according to the invention therefore facilitate the cleaning of the heating element used to heat the milk, because the use of two or more flow heaters connected in series can prevent the formation of incrustations in the flow channels of the individual flow heaters. In addition, the use of at least two flow heaters connected in series improves the product quality of a milk beverage produced from the heated milk or milk foam because no granular milk particles are produced when the milk or milk foam is heated, which can adversely affect the taste and consistency of the milk beverage.

Furthermore, by using at least two serially connected flow heaters, compared to using a single flow heater, the specifications related to electrical voltage fluctuations in power systems can be met because the heating powers of the individual flow heaters can be kept lower compared to using a single flow heater. In particular, the short-term flicker strength of the heating element of the device according to the invention, which includes at least two series-connected flow heaters, can be kept at 1.0 or less.

In order to achieve the aforementioned advantages resulting from the use of at least two flow heaters connected in series, the flow heaters of the heating element are preferably controlled or regulated in such a way that a heating output of each flow heater can be set independently of the heating output of the other flow heater or the other flow heaters of the heating element.

In a preferred embodiment of the device according to the invention, the heating element is arranged in the outlet line. This ensures a low heat loss, since after heating, the heated milk or the heated milk foam only has to be conveyed a short distance in the outlet line to an outlet of the device connected to the outlet line, in order to dispense the heated milk or the heated milk foam into a vessel, e.g. a cup, placed below the outlet. Furthermore, this arrangement enables both milk and milk foam to be heated, which is produced upstream or in the upstream region of the outlet line by mixing the milk with a gas, in particular with compressed air, and/or is introduced into the outlet line.

In a preferred embodiment, the heating element comprises (at least) a first flow heater and a second flow heater, each flow heater having a housing separate from the other flow heater and an inlet and an outlet. The two flow heaters, which are arranged one behind the other in the outlet line or the milk suction line in the direction of flow, are connected to one another in a fluid-conducting series circuit by a connecting line which is part of the outlet line or the milk suction line, i.e., for example, the outlet of the upstream first flow heater is connected to the inlet of the second flow heater arranged downstream in the direction of flow. In a corresponding manner, further flow heaters can be arranged in a series circuit.

For the production of milk foam, a gas supply line is preferably provided, which is connected to the milk suction line and/or to the outlet line and can be coupled to a gas source, in particular to a compressed gas source, in order to convey a compressed gas (hereinafter also referred to as pressurized gas), in particular compressed air, into the milk suction line and/or into the outlet line. As a result, milk foam can be generated either already in the milk suction line or in the upstream area of the outlet line (upstream of the heating element), which can be supplied via the outlet line to the heating element connected thereto with the at least two flow heaters for heating. A high degree of variability with regard to the properties of the milk foam produced results when the pressurized gas is introduced into the milk in the form of pressure pulses, because in this case the amplitude, frequency, pulse duration and/or duty cycle of the pressure pulses can be varied and thus different properties of the milk foam can be produced. The properties of the milk foam can further be influenced by the volume flow of the pressurized gas and/or the milk.

The gas supply line is expediently connected to the outlet line so that a homogeneous milk foam can be produced in the outlet line, in particular in its upstream area in front of the heating element, by supplying a compressed gas (pressurized gas), in that the compressed gas supplied via the gas supply line into the outlet line can mix with the milk. The mixing of the milk with the compressed gas takes place downstream of the pumping device. Feeding the compressed gas into the outlet line has the advantage that the function of the pump arranged upstream of the point of introduction is not adversely affected by the introduced compressed gas. In particular, by introducing the compressed gas into the milk at an introduction point located downstream of the pump, slippage or slack of the pump is prevented, allowing milk foam to be dispensed through the outlet line at a uniform volumetric flow rate. Furthermore, the delivery rate of the pump and thus the delivery speed of the milk can be adjusted independently of the volumetric flow rate or the amount of pressurized gas introduced. As a result, even with different delivery rates of the pump, the pressurized gas can be supplied at different feed pressures and thus in different quantities, which is why different foam properties of the milk foam produced, such as fine-pored or coarse-pored milk foam, can be set with an adjustable delivery volume.

In order to facilitate cleaning of the device, a cleaning line connected to the milk suction line is preferably provided, which can be connected to a cleaning agent reservoir (R), in particular to a water connection, in order to supply a liquid rinsing and/or cleaning agent, in particular water and/or an aqueous cleaning solution, to the milk suction line. Since the formation of incrustations and milk deposits in the heating element can be avoided in the device according to the invention, it is usually sufficient to rinse the device and in particular the milk suction line, the pump, the outlet line and the heating element with water only, which makes the use of expensive cleaning agents, e.g. cleaning agent tablets or solutions, superfluous.

At least one throttle point is expediently provided in the outlet line, which can be formed by a throttle valve, for example. This ensures homogeneous mixing of the milk and the compressed gas supplied through the gas supply line. An adjustable throttle valve is expediently arranged in the outlet line. This makes it possible to set a suitable cross-section of the throttle point and thus a certain throttle resistance, whereby a desired flow rate of the milk or milk foam output from the outlet line to an outlet of the device connected thereto can be set. The throttle point, e.g. the throttle valve, is expediently arranged upstream of the heating element and in particular between the inlet point of the gas supply line and the heating element.

To control the heating power of the heating element and to maintain a predetermined target temperature of the heated milk or milk foam, at least one temperature sensor for detecting the temperature of the heated milk or milk foam is expediently arranged in the outlet line downstream of the heating element.

Preferably, a temperature sensor is arranged downstream of each flow heater of the heating element and is assigned to the flow heater preceding it in the direction of flow, with the heating output of each flow heater being controlled as a function of the temperature of the milk or milk foam detected by the temperature sensors. In this way, the heating outputs of the individual flow heaters can be controlled independently of one another as a function of the measured value of the temperature sensor assigned to the respective flow heater in order to achieve the set temperature of the milk or milk foam as accurately as possible.

In order to reliably prevent the milk from burning during heating in the flow heaters, a maximum heating power is not exceeded in each flow heater, which is preferably less than 1800 W, and in particular between 450 W and 1400 W. The exact heating power of the flow heaters can be adapted to the requirements of the beverage to be produced, in particular the quantity of milk or milk foam. The exact heating power of the flow heaters can be adapted to the requirements of the beverage to be produced, in particular the quantity of milk or milk foam.

To control the heating power generated by each flow heater, a control device is expediently provided, which is preferably arranged in such a way that the heating power of the flow heaters can be controlled or regulated independently of one another.

Preferably, the control device is set up in such a way that during a heating cycle at least one first flow heater of the heating element is operated with a constant heating power p0, in particular with the maximum heating power p1, and at least one second flow heater is operated with a time-variable heating power profile p2(t). To prevent the milk from burning, the maximum heating power p1 with which the first flow heater is operated and the maximum amplitude p2 of the time-variable heating power profile p2(t) with which the second flow heater is operated are preferably each less than 1400 W, the (maximum) heating power being adaptable to the quantity of milk flowing through.

The control device is preferably arranged in such a way that the constant heating power p0, p1 of the first flow heater and the time-variable heating power profile p2(t) of the second flow heater are regulated during a heating cycle in such a way that the milk or milk foam heated in the heating element is heated in stages to a predefined set temperature. In this way, the predefined set temperature can be achieved in a targeted and accurate manner, regardless of the composition and thermal properties of the milk or milk foam. This can be further improved if a third and, if necessary, further flow heaters are connected in series with the first and second flow heaters and controlled accordingly, whereby preferably the front flow heater, as seen in the direction of flow, is operated with a constant heating power and at least one of the subsequent flow heaters is operated with a heating power that is variable over time.

The maximum amplitude p2 of the time-variable heating power profile p2(t) of the second flow heater (or further flow heaters) is preferably at most as large as the constant heating power p0, p1 of the first flow heater. This enables the milk or milk foam to be heated in stages and the temperature to be approached to the specified set temperature in a targeted manner.

For heating milk, it is advantageous to set the constant heating power p1 of the first flow heater higher than the maximum amplitude p2 of the time-variable heating power profile p2(t) of the second flow heater, preferably by a factor greater than 2, preferably by a factor between 1 and 4 and in particular by a factor of 3. For heating cold milk, a higher heating power is required compared to heating cold milk foam (at the same initial temperature and the same set temperature in each case) due to the higher heat capacity of milk compared to milk foam, which is why the constant heating power p1 of the first flow heater is selected to be greater than the maximum amplitude p2 of the time-variable heating power profile p2(t) of the second flow heater for heating milk.

For heating milk foam, on the other hand, the maximum amplitude (p2) of the time-variable heating power profile p2(t) of the second flow heater is expediently set so that it corresponds at least approximately to the constant heating power p0 of the first flow heater. Preferably, the maximum amplitude p2 of the time-variable heating power profile p2(t) of the second flow heater lies in a range of #20% of the constant heating power of the first flow heater. This allows energy-efficient adaptation of the heating outputs of the individual flow heaters to the characteristics of the product to be heated (milk or milk foam).

For heating milk or milk foam to a low temperature, e.g. in the range of 20° C. to 40° C., the maximum amplitude p2 of the time-variable heating power profile p2(t) of the second continuous flow heater can also be smaller than the constant heating power p0 of the first flow heater, which in this case is set at a low level of heating power p0 below the maximum heating power p1.

Preferably, the time-variable heating power profile p2(t) of the second flow heater is pulsed, so that a time course of the variable heating power profile p2(t) results during a heating cycle, which contains at least one or more successive pulses. The pulses, which contain, for example, square or triangular pulses or a sawtooth-shaped pulses, can be generated by pulsed control of the second flow heater with voltage pulses. The resulting time-variable heating power profile p2(t) of the second flow heater can then correspond, for example, to a square-wave signal, or a triangular signal, or a sawtooth signal. The time-variable heating power profile p2(t) of the second flow heater can also have a periodic time characteristic, in particular a sinusoidal shape.

It is advantageous to be able to vary the amplitude, the pulse duration and/or the pulse frequency and in particular the product of pulse duration and pulse frequency (duty cycle) of the pulses or the periodic time course during a heating cycle. This represents increased flexibility and makes it possible, for example, to make adjustments to the heating power of one or more flow heaters of the heating element during a heating cycle in order to adapt the final temperature of the heated milk or milk foam to the specified set temperature in order to maintain it as accurately as possible.

The flow heaters of the heating element are preferably designed as thick-film heaters. This enables a fast reaction time and thus rapid heating of a quantity of milk or milk foam required for the production of a beverage containing milk or milk foam, which is heated in one heating cycle. In this regard, each flow heater configured as a thick film heater includes a housing that is at least thermally decoupled or both thermally and locally separated from the other flow heater(s). The flow heaters can be arranged on a common plate or in a common frame, but are preferably thermally decoupled from each other and can be controlled separately, so that each flow heater can be operated independently of the other flow heater with a different heating capacity. Due to the preferred (thermal) decoupling of the housings of the individual flow heaters of the heating element, the heating power of each flow heater can be controlled or regulated independently of the heating power of the other flow heater(s) by the electric current supplied in each case. This ensures overall selective and independent control of the individual flow heaters of the heating element, as well as rapid control and adjustment of the heating output of the individual flow heaters during a heating cycle.

In preferred embodiments, each flow heater designed as a thick-film heater comprises a metallic base plate and a cover plate connected to the base plate, wherein a channel is formed between the base plate and the cover plate for the passage of the milk or the milk foam, and the base plate and/or the cover plate contains a heating resistor to which electric current can be applied in order to conductively heat the milk or the milk foam flowing through the channel. This allows a compact design of the flow heater with a low thermal mass and a fast response time. A particularly compact and space-saving design is realized if the channel of each flow heater has a meandering or spiral shape.

The invention further comprises a method for heating milk or milk foam, in which cold milk or cold milk foam is sucked by means of a pump from a milk suction line connected to a milk reservoir and is conveyed into an outlet line connected to the pump and is heated by means of a heating element, wherein the milk or milk foam is successively passed through at least two flow heaters of the heating element connected in series.

In the process, the heating power of each flow heater is preferably controlled or regulated, for example by the electric current supplied to the respective flow heater, independently of the heating power of the other flow heater(s), in order to obtain a predetermined set temperature of the milk or milk foam.

To control the heating power of the individual flow heaters, it is expedient in the process to assign a temperature sensor to each flow heater, whereby the control of the heating power of each flow heater is performed as a function of the temperature of the milk or milk foam detected by the temperature sensors.

In the process, during a heating cycle, preferably at least one first flow heater is operated with a constant heating power p0, p1 and at least one second flow heater is operated with a time-variable heating power profile p2(t), the maximum amplitude p2 of the time-variable heating power profile p2(t) of the second flow heater being particularly preferably at most as large as the constant heating power p0, p1 of the first flow heater.

For heating milk, the constant heating power p1 of the first flow heater is preferably selected to be greater than the maximum amplitude p2 of the time-variable heating power profile p2(t) of the second flow heater, preferably by a factor greater than 2, preferably by a factor between 1 and 4 and in particular by a factor of 3. A factor greater than 2 has advantages in meeting the specifications for avoiding flicker. However, if the factor is greater than 4, this results in less freedom of regulation, which is why the factor is preferably chosen to be less than 4.

For heating milk foam, the maximum amplitude p2 of the time-variable heating power profile p2(t) of the second flow heater is preferably set in the process so that it corresponds at least approximately to the constant heating power of the first continuous flow heater. In this way, a power jump of the second flow heater compared to the first flow heater and thus flicker can be avoided.

The time-variable heating power profile p2(t) of the second flow heater is thereby particularly preferably pulsed. The time characteristic of the heating power profile p2(t) of the second continuous flow heater contains at least one pulse, preferably several pulses following one another, which can have different forms, such as a square wave signal, a triangular signal or a sawtooth signal. The time course of the heating power profile p2(t) of the second flow heater can also be periodic, for example as a sinusoidal signal. Preferably, the amplitude, the pulse duration and/or the pulse frequency of the pulses or the duty cycle can be varied during a heating cycle in order to achieve a gradual, targeted and as accurate as possible approximation of the temperature of the milk or milk foam to a predetermined set temperature.

These and other advantages, as well as preferred features and characteristics of the device and the method according to the invention are apparent from the examples of embodiments described in more detail below with reference to the accompanying drawings.

Figure 4:
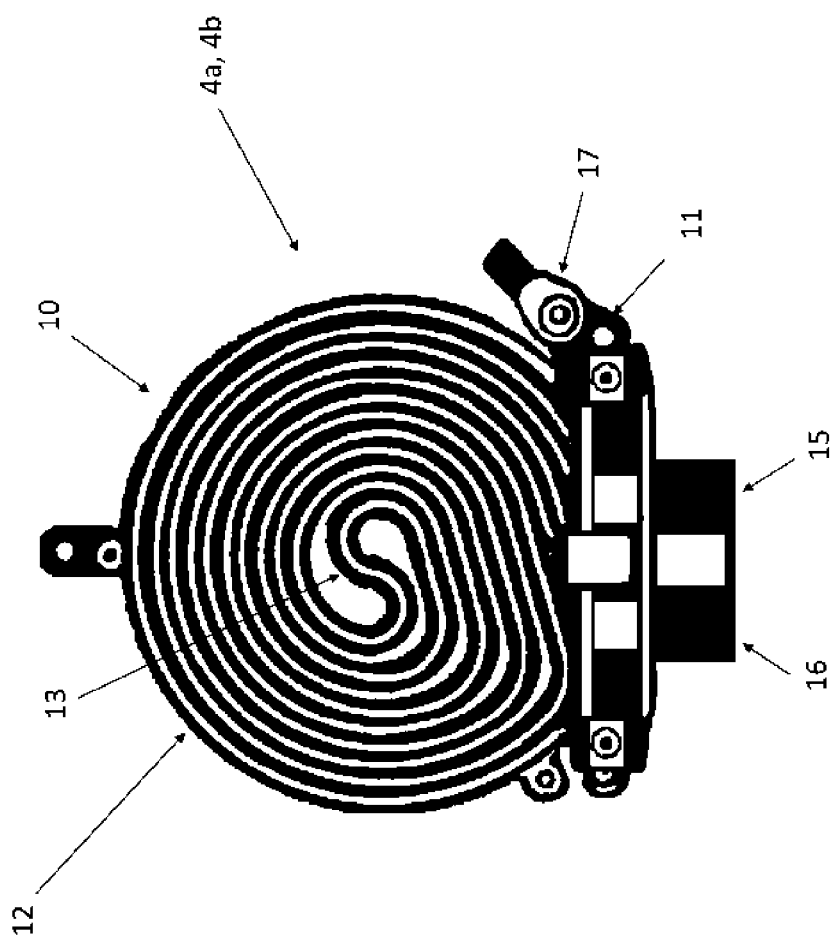

Therein, it is shown:

FIG. 1: Schematic circuit diagram of a device or process for heating milk or milk foam according to the invention:

FIG. 2: Illustration of a flow chart for heating milk (FIG. 2A) and for heating milk foam (FIG. 2B):

FIG. 3: Representation of time-dependent heating outputs of the individual flow heaters of a device according to the invention during a heating cycle, wherein FIG. 3A shows the heating output of a first flow heater, FIG. 3B shows the heating output of a second flow heater and FIG. 3C shows the total heating output of the first and the second flow heater as a function of time during a heating cycle:

FIG. 4: Illustration of a preferred embodiment of flow heaters used in the device according to the invention.

FIG. 1 shows a preferred embodiment of a device according to the invention for heating milk or milk foam, which comprises a pump 1 with a pump inlet 1a and a pump outlet 1b, a milk suction line 2 connected to the pump at the pump inlet 1a and an outlet line 3 connected to the pump at the pump outlet 1b, as well as a heating element 4 arranged in the outlet line. The milk suction line 2 is connected to a milk reservoir M, wherein the milk reservoir can be, for example, a milk container placed in a refrigerator. The outlet line 3 is connected at its downstream end to an outlet, which is not shown here.

Furthermore, the device comprises a gas supply line 5, which opens into the outlet line 3 at an entry point E. The gas supply line 5 is coupled to a gas source Q, which provides a compressed gas (pressurized gas). In the embodiment example shown, the gas source Q includes a compressor 21 which has an air supply 20 through which air is supplied, for example by drawing in ambient air. The supplied air is thereby compressed by the compressor 21 to a predetermined pressure. To control the amount of compressed gas introduced per unit of time (volume flow of the compressed gas) from the gas source Q into the gas supply line 5, a control valve V3 connected to the environment is connected to the gas supply line 5 via a control line 5'. The quantity of compressed gas introduced per unit of time from the gas source Q into the gas supply line 5 is thereby controlled on the one hand by the predetermined pressure of the compressed gas and on the other hand by the position of the control valve V3, wherein the control of the control valve V3 is preferably effected electronically by means of a pulse width modulation in order to be able to control a fine adjustment of the valve position and thereby the volume flow of the compressed gas conveyed into the gas supply line 5. At the downstream end of the gas supply line 5, in particular shortly before the inlet point E, a check valve 9 is arranged in the gas supply line 5 to prevent liquid from entering the gas supply line 5.

For cleaning the device, a cleaning line 6, which is connected to a cleaning agent reservoir R, is connected to the milk suction line 2. The cleaning line 6 comprises a first branch 6' and a second branch 6'', in each of which a shut-off valve V1, V2 is arranged. The two branches 6', 6'' of the cleaning line 6 each open into the milk suction line 2 at spaced-apart inlet points E', E'' with a check valve 9 being arranged between the two inlet points E', E''.

The pump 1 is preferably designed as a gear pump, as schematically shown in FIG. 1, and comprises two counter-rotating and intermeshing gears. The pump 1 draws milk M from the milk reservoir into the pump inlet 1a and conveys the drawn milk to the pump outlet 1b, which is connected to the outlet line 3.

A throttle point is arranged in the outlet line 3 between the inlet point of the gas supply line 5 and the heating element 4, which is formed by a throttle valve 7. The throttle valve 7 is preferably adjustable so that a suitable flow cross-section can be set in the outlet line 3.

In the embodiment shown in FIG. 1, the heating element 4 arranged downstream of the throttle valve 7 in the outlet line 3 comprises two flow heaters 4a, 4b connected in series. Downstream of the first flow heater 4a a first temperature sensor 8a is arranged, which is assigned to the first flow heater 4a, and downstream of the second flow heater 4b a second temperature sensor 8b is arranged, which is assigned to the second flow heater 4b.

The two flow heaters 4a, 4b are each designed as thick-film heaters. A preferred embodiment of such a thick-film heater is shown in FIG. 4. Each flow heater 4a, 4b designed as a thick-film heater includes a flat metallic base plate 11 and a cover plate 12 connected to the base plate 11, which has an undulating structure on the side facing the base plate 11. The base plate 11 and the cover plate 12 are connected to each other in a fluid-tight manner and form a housing 10, wherein a continuous channel 13 for passing a fluid is formed between the base plate 11 and the cover plate 12 due to the undulating structure of the cover plate 12. In the example shown in FIG. 4, the channel 13 is formed in a spiral shape. An insulating layer is arranged on the outside of the flat base plate 11, on which an electrical heating resistor in the form of a heating line with an electrical connection 17 is arranged. In this case, the heating line forming the electric heating resistor follows the spiral shape of the channel 13 between the base plate 11 and the cover plate 12. When an electric current is applied to the electric connection 17, the flow heater and a fluid flowing through the channel 13 are heated. For introducing and discharging a fluid to be heated, the channel 13 has an inlet 15 and an outlet 16. The inlet 15 and the outlet 16 are connected to connecting pieces not shown here, to each of which a line for the supply and discharge of the fluid can be connected.

The two flow heaters 4a, 4b of the heating element 4 are arranged in a series connection in the outlet line 3. In this case, the housings 10 of the two flow heaters 4a, 4b are preferably thermally separated from each other by maintaining a thermally insulating distance between the housings 10 of the two flow heaters 4a, 4b. Thermal insulation of the housings 10 of the two flow heaters 4a, 4b can also be realized by means of an insulating layer between the two housings 10, so that the two flow heaters 4a, 4b can also be arranged close to one another in a surrounding housing of the heating element 4 or on a common plate in order to achieve a compact structure. For the passage of milk or milk foam, the inlet 15 of the first flow heater 4a is connected to the outlet line 3 and the outlet 16 of the first flow heater 4a is connected to the inlet 15 of the second flow heater 4b via a connecting line 3' (as shown in FIG. 1). The outlet 16 of the second flow heater 4b is connected to the outlet line 3.

For the production of milk foam in the device of FIG. 1, milk is sucked from the milk reservoir M through the milk suction line 2 by means of the pump 1 and is conveyed into the outlet line 3. At the same time, a compressed gas (pressurized gas), in particular compressed air, is conveyed at a predetermined pressure into the outlet line 3 via the gas supply line 5. The milk and the compressed gas mix in the outlet line 3 to form a milk-gas mixture, in particular a milk-air mixture. Homogeneous mixing of the milk and the compressed gas can be achieved by suitable adjustment of the pressure of the compressed gas and of the throttle valve 7.

With the device of FIG. 1, either milk or milk foam can be heated and dispensed through the outlet of the device, which is not shown here, into a vessel G, for example a cup, placed under the outlet. When cold milk from the milk reservoir M is to be heated by the device without frothing the milk, the gas supply line 5 is closed or the gas source Q is shut off and the cold milk drawn from the milk reservoir M by the pump 1 is conveyed into the outlet line 3 and is successively passed through the two flow heaters 4a, 4b of the heating element 4. The two flow heaters 4a, 4b of the heating element 4 can be supplied with electric current independently of each other for heating the milk passed through. In doing so, different heating powers are set in the two flow heaters 4a, 4b.

FIG. 2A shows an example of a preferred flow diagram for heating cold milk in the device of FIG. 1. The first flow heater 4a can be controlled in two different operating stages. In a first operating stage, the first flow heater 4a can be operated with a maximum heating power p1. The maximum heating power is selected in such a way that burning of milk is prevented and is, for example, 1,400 watts. In a second operating stage, the first flow heater 4a can also be operated with a lower heating power p0<p1. The second flow heater 4b, which follows in the direction of flow of the milk passing through, can also be controlled in two operating stages. In a first operating stage, the second flow heater 4b can be operated with the same maximum heating power p1 as the first flow heater 4a, or with a constant heating power p0 that is lower than the maximum heating power p1. In a second operating stage, the second flow heater 4b can be operated with a time-variable heating power profile $p2(t)$, wherein the (maximum) amplitude p2 of the time-variable heating power profile $p2(t)$ is smaller than the maximum heating power and thus smaller than the heating power p1 of the first operating stage of the first flow heater 4a. Preferably, when heating milk, the (maximum) amplitude p2 of the time-variable heating power profile $p2(t)$ is in a range of $0.1 \cdot p1$ to $0.5 \cdot p1$. To avoid flicker, the constant heating power p0 or the maximum amplitude p2 of the second flow heater 4b is preferably below 600 W, in particular below 450 W.

The temporal course of the heating outputs in the operating stages of the first flow heater 4a and the second flow heater 4b from the exemplary flow chart of FIG. 2A is shown graphically in FIG. 3, where FIG. 3A shows the temporal course of the heating output of the first flow heater 4a and FIG. 3B shows the temporal course of the heating output of the second flow heater 4b. As can be seen from FIG. 3A, the first flow heater 4a has a temporally constant heating power of p1 or p0 in both the first and the second operating stage, the heating power p1 in the first operating stage corresponding to the maximum heating power of, for example, 1400 watts, and the second operating stage having a lower heating power p0 which is, however, also constant in time during a heating cycle. A heating cycle, in which a quantity of milk, for example 40 ml, is passing through the two flow heaters 4a, 4b, is heated to a predetermined set temperature, is defined by the start t1 and the end t2, and the total heating time $\Delta t$ of a heating cycle results from the difference between the times t2 and t1: $\Delta t = t2 - t1$.

As can be seen from FIG. 3B, the second operating stage of the second flow heater 4b has a number of pulses with different pulse duration and pulse frequency which follow one another within the heating cycle. Preferably, both the amplitude p2 of the pulses and the pulse duration and/or the pulse frequency and, in particular, the duty cycle resulting from the product of the pulse frequency and the pulse duration, can be varied during a heating cycle.

FIG. 3C shows the total heating power of the heater 4 as a function of time during a heating cycle between the start t1 and the end t2. The total heating power of the heating element 4 results from the sum of the time-dependent heating powers of the two flow heaters 4a, 4b connected in series, as shown in FIG. 3C.

For heating cold milk in the device of FIG. 1, cold milk M is conveyed through the heating device 4 in accordance with the flow diagram of FIG. 2A at an initial temperature which may lie, for example, between 0° C. and 20° C. and, in particular, between 4° C. and 10° C., and the first flow heater 4a of the heating device 4 is operated, for example, in the first operating stage at the maximum heating power p1 and the second flow heater 4b is operated in the second operating stage at a heating power p2 (t) which is variable over time. A control device not shown here is provided for the corresponding control of the two flow heaters 4a, 4b, which is set up in such a way that the heating outputs of the two flow heaters 4a, 4b can be set independently of one another and can be controlled to heat the milk to a setpoint temperature which can be predetermined.

The flow rate of the milk to be heated can be adjusted to the desired amount of hot milk and is, for example, between 10 and 500 ml/min. The intermediate temperature to which the milk is heated in the first flow heater 4a depends on the power level (p1, p0) at which this flow heater 4a is operated and is higher than the initial temperature of the cold milk and can be up to 80° C. in particular. The final temperature to which the milk is heated after passing through the second flow heater 4a corresponds to the set temperature, which is in particular in the range from 20° C. to 80° C.

To control the heating power of the two flow heaters 4a, 4b, the temperature of the milk passed through is detected by temperature sensors 8a. 8b associated with the two flow heaters 4a, 4b. As indicated in FIG. 2A, the temperature of the milk passed through the first flow heater 4a, which is detected by the first temperature sensor 8a, is preferably between 45° C. and 65° C., and the final temperature of the milk heated in the heating device 4 after leaving the second flow heater 4b is, for example, in the range of 65° C. to 75° C. In order to set a predetermined target temperature of the heated milk, which lies, for example, in the range from 65° C. to 75° C., the control device controls the second flow heater 4b during a heating cycle in such a way that the predetermined target temperature is reached as precisely as possible. For this purpose, the profile of the heating power of the second continuous flow heater 4b can be adjusted during an ongoing heating cycle by changing the amplitude p2, the pulse duration and/or the pulse frequency or duty cycle of the heating power pulses. In particular, the parameters of the time profile of the heating power p2 (t) of the second flow heater 4b can be adapted to the temperature of the milk detected by the preceding first temperature sensor 8a. Furthermore, the parameters of the temporal profile of the heating power p2 (t) of the second flow heater 4b can be adjusted to previous heating cycles depending on the parameters detected there, in particular the milk temperatures detected by the two temperature sensors 8a and 8b.

The control device can also take other parameters into account for the activation or control of the two flow heaters 4a, 4b, such as, for example, the input temperature of the milk, which can be detected, if necessary, via a further third temperature sensor preferably arranged in the milk suction line 2. Furthermore, when heating milk foam, parameters can be taken into account in the control of the two flow heaters 4a, 4b, which take into account the composition of the milk foam and, in particular, the gas content in the milk foam. These parameters can be detected by further sensors, such as a flow meter and/or a pressure sensor in the gas supply line 5 and are fed to the control device.

FIG. 2B schematically shows a procedure for heating a milk-gas mixture (milk foam M+G) in the device of FIG. 1. For this purpose, the milk foam M+G produced by mixing cold milk (which in turn may, for example, have an initial temperature in the range from 0° C. to 20° C. and in particular from 4 to 10° C.) with the pressurized gas is passed successively through the two flow heaters 4a, 4b of the heating element 4. In contrast to the heating of milk, the first flow heater 4a for heating milk foam in the second operating stage is operated at the lower heating power p0. Due to the lower heat capacity of milk foam compared to that of liquid milk, the milk foam in the first flow heater 4a is heated, despite the lower heating power, at least approximately to a temperature which is in the same range as the temperature of the milk which has been heated in the first flow heater 4a in the flow diagram according to FIG. 2A. The lower heating power p0 of the first flow heater is selected accordingly, so that the milk foam passed through is heated to a temperature in the preferred range of 45 to 65° C. in the flow diagram of FIG. 2B. The second flow heater 4b is operated in the flow diagram of FIG. 2B during the heating of milk foam again in the second operating stage with a temporally variable heating power profile p2 (t), whereby also here both, the amplitude p2 and the pulse duration and/or the frequency or the duty cycle of the pulses, can be adapted and also changed during an ongoing heating cycle, as in the heating of milk according to the flow diagram of FIG. 2A. The final temperature of the heated milk foam M+G is as close as possible to the specified set temperature, which is preferably in the range of 65 to 75° C. The two flow heaters 4a, 4b are thereby controlled by the control device in such a way that the final temperature of the heated milk foam M+G corresponds as closely as possible to the specified set temperature. The (maximum) amplitude p2 of the time-variable heating power profile p2(t) of the second flow heater 4b preferably corresponds at least approximately to the heating power p0 with which the first flow heater 4a is operated. Preferably, when heating milk foam, the (maximum) amplitude p2 of the time-variable heating power profile p2(t) lies in a range from 0.8·p0 to 1.2·p0.

The temperatures of the milk or milk foam given in the examples in FIG. 2 are only to be understood as examples and can be adapted to the requirements.

For cleaning the device, the milk suction line 2 is removed from the milk reservoir M and a cleaning agent, for example water, is conveyed through the cleaning line 6 into the milk suction line 2. Thereby, via the two branches 6', 6" of the cleaning line 6, both the upstream area of the milk suction line 2 and the downstream area connected to the pump inlet 1a of the pump 1 can be cleaned by passing the liquid cleaning agent. The cleaning agent can thereby be sucked in by the pump 1 and conveyed into the outlet line 3, whereby the cleaning agent also flows through the channel 13 of the two flow heaters 4a, 4b respectively from the inlet 15 to the outlet 16 and thereby frees them from milk constituents.

The device and the method according to the invention are not limited to the embodiments shown here in the drawings. For example, the heating element 4 can also be arranged in the milk suction line 2 instead of in the outlet line 3. The gas supply line 5 may also be connected to the outlet line 3 downstream of the heating element 4. Furthermore, the gas supply line 5 may also be connected to the milk suction line 2 instead of the outlet line 3. An introduction of a pressurized gas into both the outlet line 3 and the milk suction line 2 is also possible. The heating element 4 can also be arranged in the milk suction line 2 instead of in the outlet line 3.

Furthermore, a mixing container can be arranged in the cleaning line 6, in which a cleaning agent, for example in powder or tablet form, is dissolved in water to produce an aqueous cleaning solution. Instead of the pump 1 designed as a gear pump, other pumping devices, such as a peristaltic pump, can also be used in the device. Instead of the gas source Q shown in FIG. 1, which comprises a compressor 21 that compresses air supplied from the environment to a predetermined pressure, another gas source, such as a cartridge containing a compressed gas, can also be used. In addition to air, other food-grade gases can also be used as the compressed gas, such as carbon dioxide or nitrogen.

Furthermore, the number of flow heaters of the heating element 4 connected in series can be increased. It is also possible to operate several or all of the flow heaters each with a temporally constant heating power during a heating cycle. However, it is also possible to operate one or more flow heaters of the heating element 4 with a temporally constant heating power and to operate one or more further flow heaters with a temporally variable heating power profile, i.e. a controllable heating power profile.

The invention claimed is:

1. A device for producing milk or milk foam beverages, the device comprising a pump, a milk suction line which is connected to the pump and is connectable to a milk reservoir, an outlet line connected to the pump, a heating element comprising a plurality of flow heaters comprising at least a first flow heater and a second flow heater arranged in series, and a control device; wherein each flow heater of the plurality of flow heaters is providing adjustable heating power, wherein the control device controls the adjustable heating power of each flow heater, wherein the adjustable heating power of each flow heater is controllable or adjustable independently of the adjustable heating power of the other flow heaters of the plurality of flow heaters over an electric current supplied to each of the flow heaters, wherein the control device operates the first flow heater with a constant heating power profile and the second flow heater with a time-variable heating power profile, and wherein each flow heater of the plurality of flow heaters has a housing which is thermally decoupled from the housings of the other flow heaters of the plurality of flow heaters.

2. The device according to claim 1, wherein the flow heaters of the plurality of flow heaters are arranged one behind the other and are fluidly connected to one another via a connecting line, wherein the connecting line is part of the milk suction line or the outlet line.

3. The device according to claim 1, wherein each flow heater of the plurality of flow heaters comprises a base plate, a cover plate connected to the base plate, and a channel formed between the base plate and the cover plate, the channel being intended for the passage of milk or milk foam, wherein at least one of the base plate and the cover plate contains a heating resistor to which the electric current being applied via a current connection for conductively heating the milk or the milk foam flowing through the channel.

4. The device according to claim 3, wherein the channel of each flow heater of the plurality of flow heaters has a meander shape or a spiral shape.

5. The device according to claim 1, wherein a temperature sensor is arranged downstream of each flow heater of the plurality of flow heaters and the heating power of each flow heater is controlled or regulated upon the temperature of the milk or of the milk foam detected by the temperature sensors.

6. The device according to claim 1, wherein, for heating milk, the constant heating power profile of the first flow heater has a maximum amplitude which is greater than a maximum amplitude of the time-variable heating power profile of the second flow heater.

7. The device according to claim 1, wherein, for heating milk foam, the constant heating power profile of the first heater has a maximum amplitude which is essentially equivalent to a maximum amplitude of the time-variable heating power profile of the second flow heater.

8. The device according to claim 1, wherein the time-variable heating power profile of the second flow heater comprises a plurality of pulses.

9. The device according to claim 1, wherein the time-variable heating power profile of the second flow heater comprises a plurality of pulses, wherein at least one of an amplitude, a pulse duration, a pulse frequency, and a duty cycle of the plurality of pulses being varied during a heating cycle.

10. The device according to claim 1, wherein the control device is arranged to regulate the time-variable heating power profile of the second flow heater during a heating cycle for heating the milk or the milk foam to a predetermined set temperature.

* * * * *